United States Patent
Takemoto (10) Patent No.: US 9,555,669 B2
(45) Date of Patent: Jan. 31, 2017

(54) PNEUMATIC TIRE

(71) Applicant: Sumitomo Rubber Industries, Ltd., Kobe-shi, Hyogo (JP)

(72) Inventor: Yoshiaki Takemoto, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 554 days.

(21) Appl. No.: 14/020,225

(22) Filed: Sep. 6, 2013

(65) Prior Publication Data

US 2014/0190606 A1    Jul. 10, 2014

(30) Foreign Application Priority Data

Jan. 8, 2013   (JP) .................................. 2013-001268

(51) Int. Cl.
*B60C 11/12*   (2006.01)
*B60C 11/03*   (2006.01)

(52) U.S. Cl.
CPC ............ *B60C 11/0304* (2013.04); *B60C 11/12* (2013.01); *B60C 11/1218* (2013.04);
(Continued)

(58) Field of Classification Search
CPC ............. B60C 11/0304; B60C 11/1218; B60C 11/1236; B60C 2011/1227; B60C 2011/0379; B60C 2011/0381
(Continued)

(56) References Cited

U.S. PATENT DOCUMENTS 6,415,835 B1 *  7/2002  Heinen ............... B60C 11/0309
                                                    152/209.21
7,334,619 B2 *  2/2008  Kishida .............. B60C 11/0306
                                                    152/209.21
(Continued)

FOREIGN PATENT DOCUMENTS

EP    2202098      *  6/2010
EP    2578418 A1     4/2013
(Continued)

OTHER PUBLICATIONS

English machine translation of JP2010-254155, dated Nov. 2010.*
Extended European Search Report, dated Aug. 12, 2014, for European Application No. 13183308.9.

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A pneumatic tire includes a tread portion with an asymmetric pattern including an outboard shoulder main groove, an inboard shoulder main groove, an outboard shoulder portion between the outboard shoulder main groove and an outboard tread edge, a middle portion between the outboard shoulder main groove and the inboard shoulder main groove, and an inboard shoulder portion between the inboard shoulder main groove and an inboard tread edge, wherein the outboard shoulder portion is provided with a three dimensional sipe that has a pair of sipe surfaces extending to a depth direction of the sipe while changing its direction or opening configuration, and the inboard shoulder portion or the middle portion is provided with a two dimensional sipe that has a pair of sipe surfaces extending to a depth direction of the sipe while maintaining its direction and opening configuration.

10 Claims, 7 Drawing Sheets (52) U.S. Cl.
CPC ... *B60C 11/1236* (2013.04); *B60C 2011/0346* (2013.04); *B60C 2011/0348* (2013.04); *B60C 2011/0374* (2013.04); *B60C 2011/0381* (2013.04); *B60C 2011/0395* (2013.04); *B60C 2011/1227* (2013.04)

(58) Field of Classification Search
USPC .......................................... 152/209.8, 209.27
See application file for complete search history.

(56) References Cited

U.S. PATENT DOCUMENTS

| | | | |
|---|---|---|---|
| 2004/0134579 A1* | 7/2004 | Tanaka | B60C 11/00 152/209.1 |
| 2007/0199634 A1* | 8/2007 | Sakamaki | B60C 11/11 152/209.23 |
| 2010/0224297 A1* | 9/2010 | Kiwaki | B60C 11/11 152/209.23 |
| 2011/0120608 A1* | 5/2011 | Watabe | B60C 11/12 152/209.18 |
| 2012/0261044 A1* | 10/2012 | Numata | B60C 11/0304 152/209.8 |
| 2013/0118663 A1 | 5/2013 | Kishizoe | |

FOREIGN PATENT DOCUMENTS

| | | | |
|---|---|---|---|
| JP | 2005-041393 | * | 2/2005 |
| JP | 2010-254155 | * | 11/2010 |
| JP | 2011-162022 A | | 8/2011 |

* cited by examiner

PNEUMATIC TIRE

BACKGROUND OF THE INVENTION

Field of the Invention

The present invention relates to a pneumatic tire that offers an improved traveling performance on an icy road while maintaining steering stability on a dry road and wear resistance.

Description of the Related Art

In order to improve traveling performance on a icy road, Japanese patent application laid-open No. 2011-162022 discloses a pneumatic tire having a tread block provided with two dimensional sipes that divide the tread block into a plurality of block-pieces with edges for scratching the icy road surface. Typically, the two dimensional sipe comprises a pair of sipe surfaces each of which uniformly extends to a bottom of the sipe while keeping its direction and opening configuration. The adjacent block-pieces divided by the two dimensional sipe are usually easy to deform each other through the sipe surfaces when the tire is subjected to friction force on the road, such that each edge of the block-pieces provides high friction force by scratching the icy road surface.

However, the large deformation of block-pieces causes loss of ground contact area of the tread block, whereby steering stability of the tire on dry roads and wear resistance of the tread block tends to deteriorate.

SUMMARY OF THE INVENTION

The present invention has been worked out in light of the circumstances described above, and has a main object of providing a pneumatic tire that offers an improved traveling performance on an icy road while maintaining steering stability on a dry road and wear resistance.

In accordance with the present invention, there is provided a pneumatic tire including a tread portion having an asymmetric pattern having a designated installing direction to a vehicle for defining an inboard tread edge and an outboard tread edge, and the asymmetric pattern that including an outboard shoulder main groove that continuously extends in a circumferential direction of the tire nearest to the outboard tread edge, an inboard shoulder main groove that continuously extends in a circumferential direction of the tire nearest to the inboard tread edge, an outboard shoulder portion between the outboard shoulder main groove and the outboard tread edge, a middle portion between the outboard shoulder main groove and the inboard shoulder main groove, and an inboard shoulder portion between the inboard shoulder main groove and the inboard tread edge. The outboard shoulder portion is provided with a three dimensional sipe that has a pair of sipe surfaces extending to a depth direction of the sipe while changing its direction or opening configuration, and the inboard shoulder portion or the middle portion is provided with a two dimensional sipe that has a pair of sipe surfaces extending to a depth direction of the sipe while maintaining its direction and opening configuration.

DETAILED DESCRIPTION

An embodiment of the present invention will be explained below with reference to the accompanying drawings. Before the present invention is described in detail, it should be noted that like elements are denoted by the same reference numerals throughout the disclosure.

Figure 1:
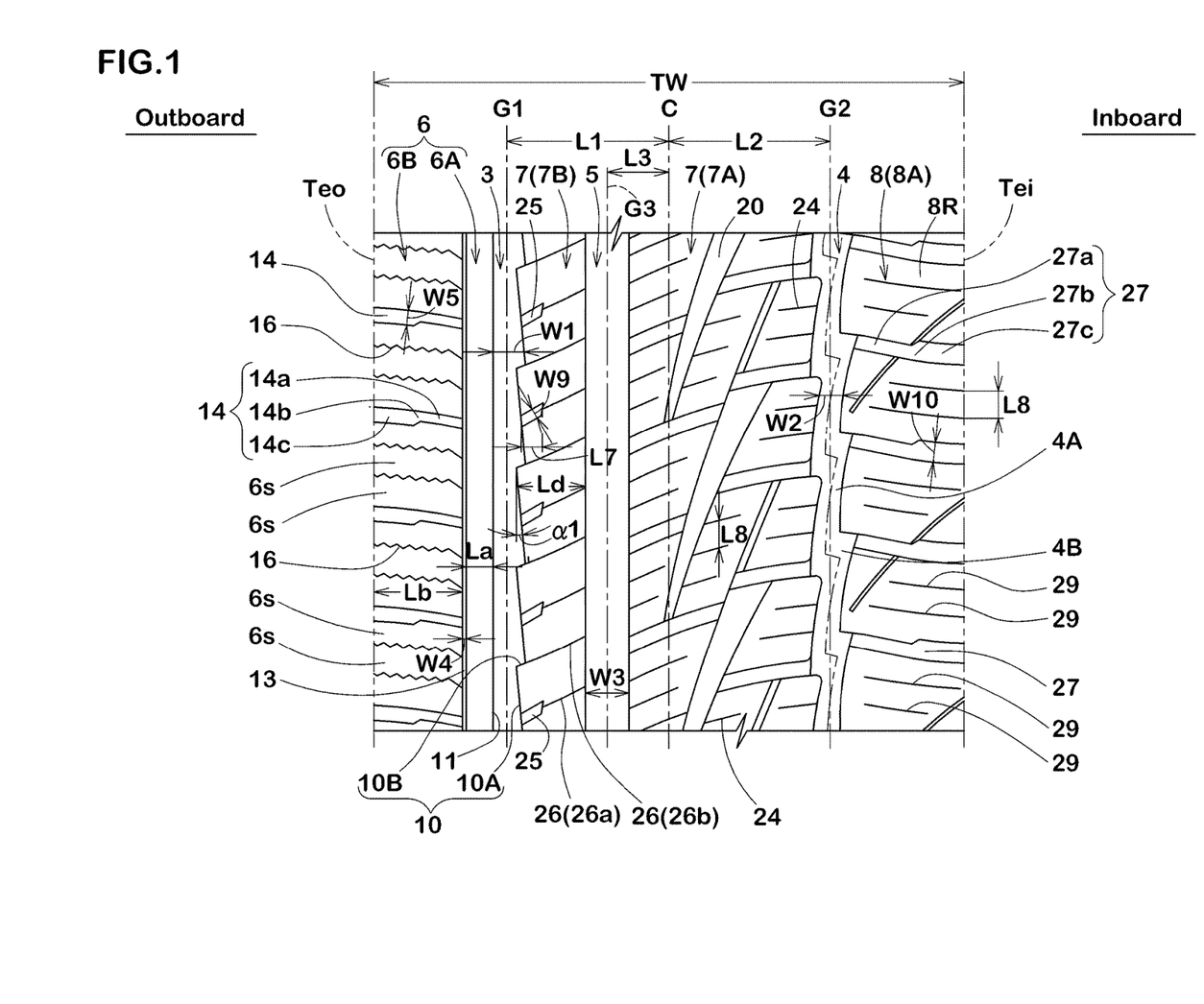
FIG. 1 is a development view of a tread portion of a pneumatic tire showing an embodiment of the present invention.

Referring to FIG. 1, a pneumatic tire (hereinafter it may simply be referred as "the tire") in accordance with the present invention comprises a tread portion 2 with an asymmetric pattern having a designated installing direction to a vehicle for defining an inboard tread edge (Tei) and an outboard tread edge (Teo). The installing direction of the tire 1 may be indicated on its sidewall portion (not shown) using characters or the like, for example.

The inboard tread edge (Tei) refers to one of the two tread edges, which is intended to be positioned towards the center of the vehicle body. The outboard tread edge (Teo) refers to the other tread edge which is intended to be positioned away from the center of the vehicle body. According thereto, in this application, the terms "outboard" and "inboard" are used toward the outboard tread edge (Teo) and inboard tread edge (Tei), respectively, to refer relative positions in the tire axial direction. The terms "axially inner", "axially inward" and the like are used toward a tire equator C, and the terms "axially outer", "axially outward" and the like are used toward the tread edge in order to refer relative positions in the tire axial direction.

Here, tread edges are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW of the tread portion 2 is defined as the width measured under a normally inflated unloaded condition, as the axial distance between the inboard and outboard tread edges Tei, Teo determined as above. The normally inflated unloaded condition is such that the tire is mounted on the standard wheel rim and is inflated to the standard pressure but loaded with no tire load.

In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard load is the "maximum load capacity" in JATMA, the "Load capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

The tread portion 2 is provided with a plurality of circumferentially and continuously extending main grooves that comprise: an outboard shoulder groove 3 disposed closest to the outboard tread edge (Teo); an inboard shoulder main groove 4 disposed closest to the inboard tread edge (Tei); and a middle main groove 5 disposed between the tire equator C and the outboard shoulder main groove 3.

Thus, the tread portion 2 is formed a plurality of land portions that include an outboard shoulder portion 6 between the outboard shoulder main groove 3 and the outboard tread edge (Teo), a middle portion 7 between the outboard shoulder main groove 3 and inboard shoulder main groove 4, and an inboard shoulder portion 8 between the inboard shoulder main groove 4 and the inboard tread edge (Tei). In this embodiment, the middle portion 7 comprises an inboard middle portion 7A between the middle main groove 5 and the inboard shoulder main groove 4, and an outboard middle portion 7B between the middle main groove 5 and the outboard shoulder main groove 3.

The outboard shoulder main groove 3 includes an axially inner groove edge 10 extending in a zigzag manner that comprises an inclined long side 10A and an inclined short side 10B having an inclination opposite to the inclined long side 10A, that are arranged alternately in a circumferential direction of the tire. The axially inner groove edge 10 of the outboard shoulder main groove 3 helps to increase not only snow shearing force on a snowy road, but also friction force against on an icy road when braking or accelerating, by offering its lateral edge components. The outboard shoulder main groove 3 also includes an axially outer groove edge 11 straightly extending along the circumferential direction of the tire to effectively drain the water from under the tread portion 2 backwardly.

In order to maximize drainage performance and lateral edge effect as mentioned above, the inclined long side 10A preferably has an angle $\alpha 1$ in a range of not less than 5 degrees, more preferably not less than 7 degrees, but preferably not more than 15 degrees, more preferably not more than 13 degrees.

In this embodiment, the middle main groove 5 has a straight shape extending along the circumferential direction of the tire to effectively drain the water from under the tread portion 2 backwardly of the tire. Furthermore, such a middle main groove 5 maintains rigidity of the inboard and outboard middle portions 7A and 7B high, whereby straight running stability of the tire may be improved.

In this embodiment, the inboard shoulder main groove 4 extends in a zigzag manner that comprises an inclined long side 4A (upward to the right in FIG. 1) and an inclined short side 4B having an inclination opposite to the inclined long side 4A, that are arranged alternately in a circumferential direction of the tire. Such a zigzag inboard shoulder main groove 4 helps to reduce drainage resistance. Preferably, each inclined long side 4A may extend in an arc manner.

Figure 2:
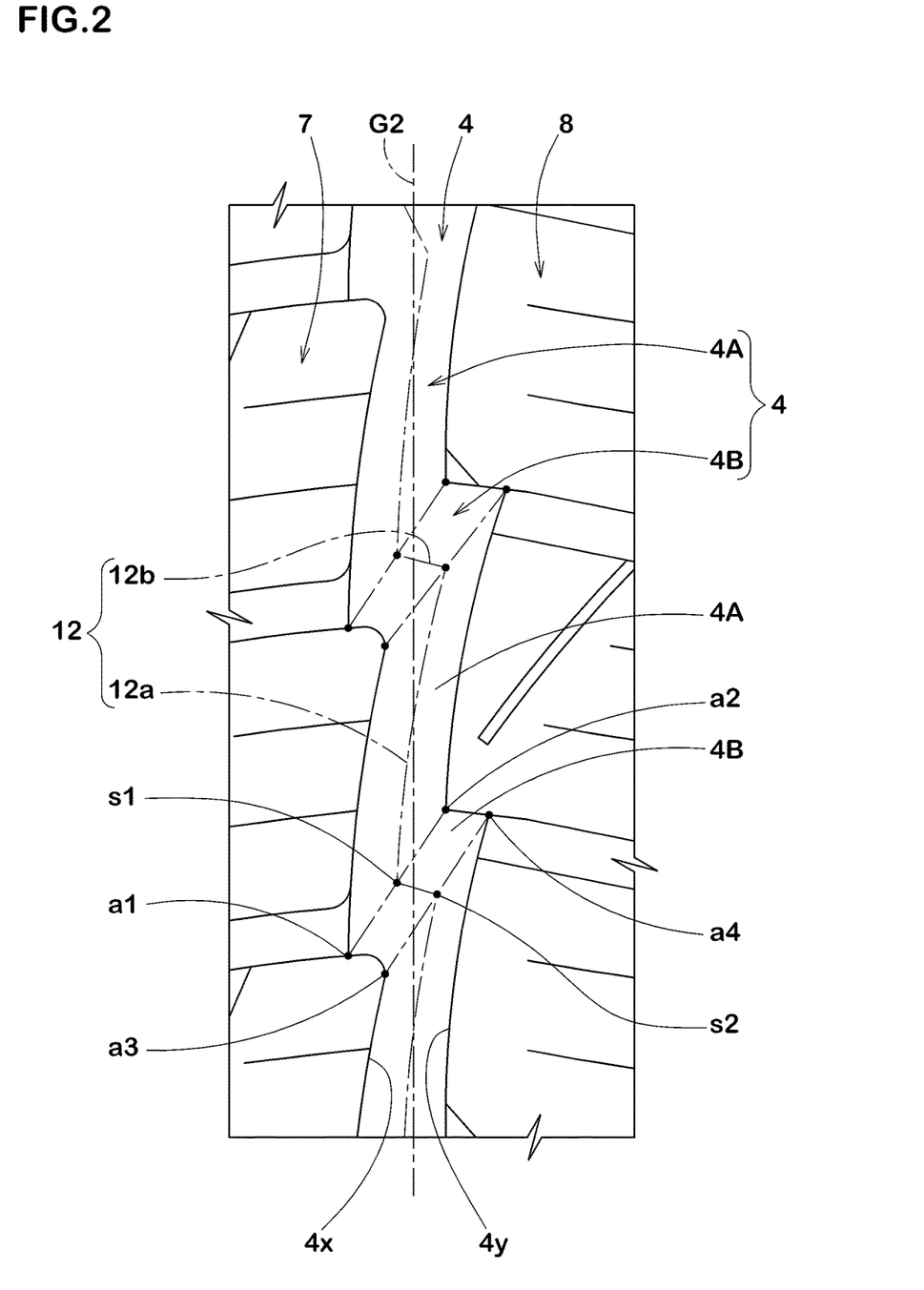
FIG. 2 is a partial enlarged view of an inboard shoulder main groove.

FIG. 2 shows a partial enlarged view of the inboard shoulder main groove 4. Referring to FIG. 2, a groove centerline 12 of the inboard shoulder main groove 4 comprises a centerline 12a of the inclined long side 4A and a centerline 12b of the inclined short side 4B, which extends so as to alternately pass a first point s1 and a second point s2. In the inboard shoulder main groove 4, the first point s1 is a center point of the line that connects between the axially innermost point a1 of the axially inner groove edge 4x and the axially innermost point a2 of the axially outer groove edge 4y. similarly, the second point s2 is a center point of the line that between the axially outermost point a3 of the axially inner groove edge 4x and the axially outermost point a4 of the axially outer groove edge 4y.

Referring to FIG. 1, each of the outboard shoulder main groove 3, inboard shoulder main groove 4 and middle main groove 5 has a groove width W1, W2 and W3, respectively. In order to further improve drainage performance while maintaining steering stability and wear resistance, each groove width W1, W2 and W3 is preferably in a range of not less than 3.0 mm, more preferably not less than 3.5 mm, but preferably not more than 9.0 mm, more preferably not more than 8.5 mm.

Preferably, each groove depth of main grooves 3 to 5 is in a range of not less than 6.0 mm, more preferably not less than 6.5 mm, but preferably not more than 10.0 mm, more preferably not more than 9.5 mm. In this embodiment, the middle main groove 5 has the largest groove depth and groove volume in the main grooves 3 to 5, whereby drainage performance around the tire equator C further improves.

Preferably, the location for each of main grooves 3 to 5 is determined taking into rigidity of each land portion 6 to 8 so that steering stability on a dry road may be effectively improved. Preferably, the axial distance L1 between the tire equator C and the groove centerline G1 of the outboard shoulder main groove 3 is in a range of from 22.5% to 32.5% in respect to the tread width TW. Preferably, the axial distance L2 between the tire equator C and the groove centerline G2 of the inboard shoulder main groove 4 is in a range of from 20.0% to 30.5% in respect to the tread width TW. Preferably, the axial distance L3 between the tire equator C and the groove centerline G3 of the middle main groove 5 is in a range of from 6.0% to 16.0% in respect to the tread width TW. A straightly extending line along the circumferential direction of the tire is regarded as each groove centerline G1, G2 for determine the location of each main groove as mentioned above, even if actual groove centerlines extend in a zigzag manner like the inboard and outboard shoulder main grooves 3, 4.

The outboard shoulder portion 6 is provided with a circumferentially extending shoulder narrow groove 13 such that the outboard shoulder portion 6 is divides into an axially inner shoulder narrow portion 6A between the outboard shoulder main groove 3 and the shoulder narrow groove 13, and an axially outer shoulder wide portion 6B between the shoulder narrow groove 13 and the outboard tread edge (Teo).

In order to improve steering stability using a longitudinal edge of the shoulder narrow groove 13 while maintaining rigidity of the axially outer shoulder wide portion 6B, the shoulder narrow groove 13 preferably extends in straight manner.

Preferably, the shoulder narrow groove 13 has a groove width W4 in a range of from 0.5 to 2.0 mm, in order to effectively improve the advantage above. Furthermore, the shoulder narrow groove 13 preferably has a groove depth in a range of from 0.5 to 2.0 mm. In this specification and claims, a groove width is defined as a width measured perpendicular to its groove centerline.

In order to improve rigidity balance between the axially inner shoulder narrow portion 6A and the axially outer shoulder wide portion 6B, the axial width La of the axially inner shoulder narrow portion 6A is preferably in a range of from 15% to 35% in respect to the axial width Lb of the axially outer shoulder wide portion 6B.

The outboard shoulder portion 6 is further provided with a plurality of shoulder lug grooves 14 each of which extends from the outboard tread edge (Teo) to the shoulder narrow groove 13. In this embodiment, the shoulder lug grooves 14 comprises: a first portion 14a extending from the shoulder narrow groove 13 with a constant groove width; a second portion 14b extending from the first portion 14a toward the outboard tread edge (Teo) while expanding its groove width; and a third portion 14c extending to the outboard tread edge (Teo) from the second portion 14b with a constant groove width that is larger than that of the first portion 14a. Thus, the water under the outboard shoulder portion 6 is preferably dispersed from the outboard tread edge (Teo).

Preferably, the shoulder lug groove 14 has its groove width W5 in a range of not less than 2.0 mm, more preferably not less than 2.5 mm, but preferably not more than 5.5 mm, more preferably not more than 5.0 mm, in order to improve drainage performance while maintaining rigidity of the outboard shoulder portion 6. Similarly, the shoulder lug groove 14 preferably has its groove depth in a range of not less than 3.0 mm, more preferably not less than 3.5 mm, but preferably not more than 7.0 mm, more preferably not more than 6.5 mm.

The outboard shoulder portion 6 is further provided with a plurality of three dimensional sipes 16 each of which has a pair of sipe surfaces 16S (shown in FIG. 3) extending to a depth direction of the sipe while changing its direction or opening configuration. The three dimensional sipes 16 divide the outboard shoulder portion 6 into narrow block-pieces 6s that respectively engage and support each other through the sipe surfaces 16S therebetween for preventing large deformation thereon. Thus, the three dimensional sipes 16 may prevent not only loss of ground contact area of the outboard shoulder portion 6, but also loss of friction force, while maintaining its edge scratching effect against the roads. Thus, although the outboard shoulder portion 6 is subjected to large lateral force when cornering, the three dimensional sipes 16 help to improve steering stability on an icy and dry road while maintaining wear resistance by preventing large deformation of block-pieces.

In this embodiment, the three dimensional sipe 16 extends from the outboard tread edge (Teo) to the shoulder narrow groove 13 without reaching the outboard shoulder main groove 3 for enhancing rigidity of the outboard shoulder portion 6.

Figure 3:
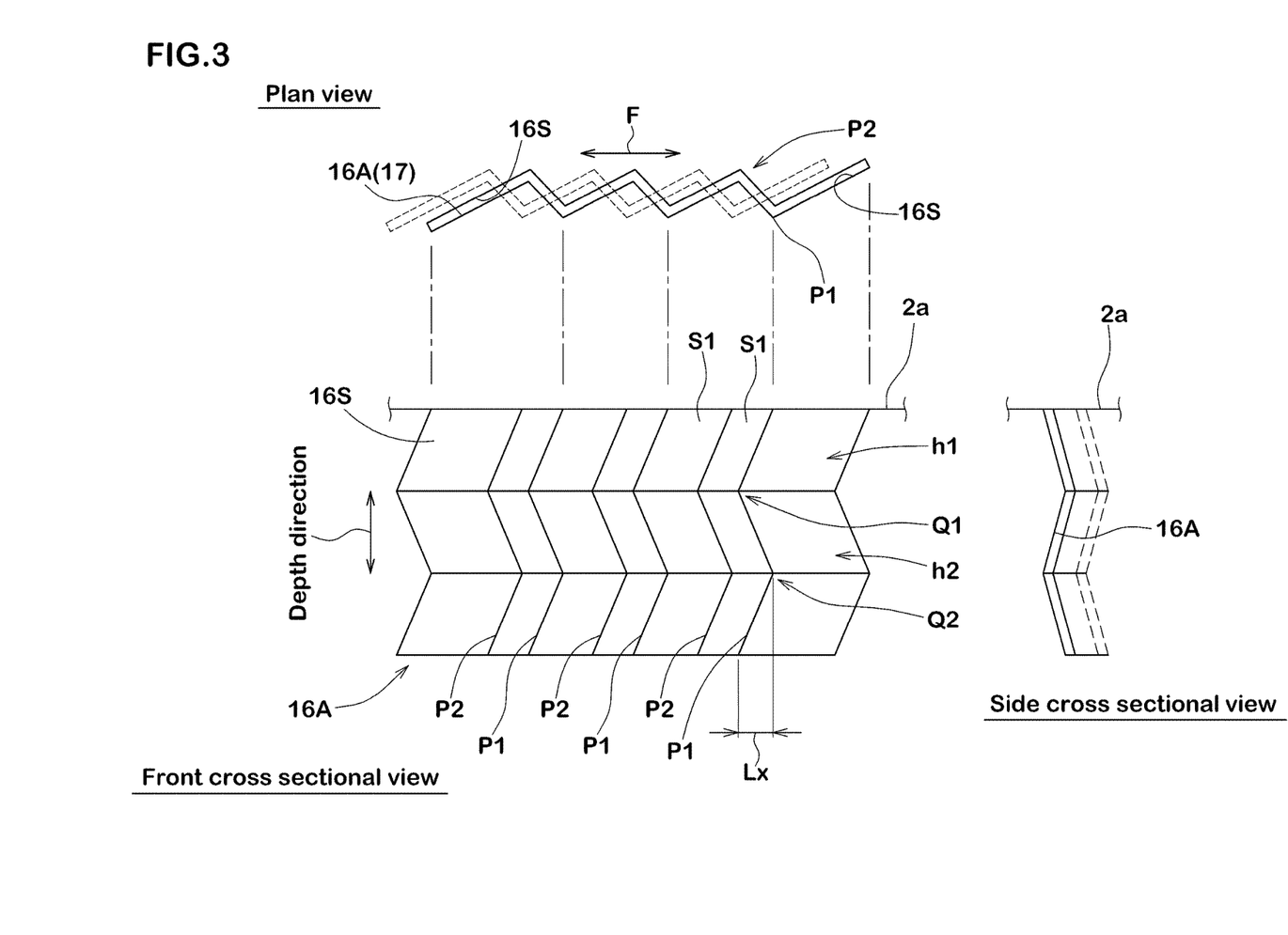
FIG. 3 is a trihedral figure of a three dimensional sipe showing an embodiment of the present invention.
Figure 4:
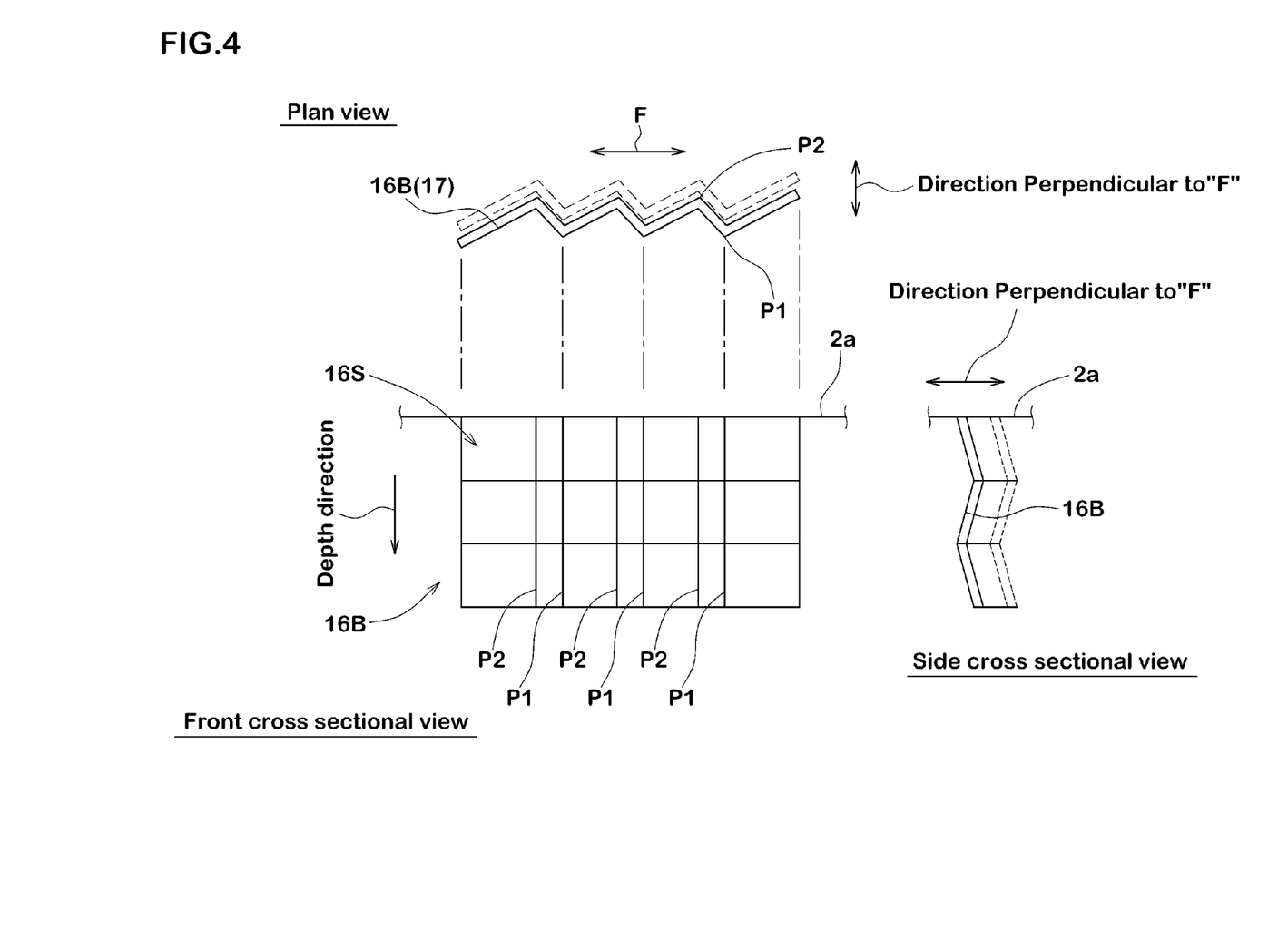
FIG. 4 is a trihedral figure of a three dimensional sipe showing another embodiment of the present invention.
Figure 5:
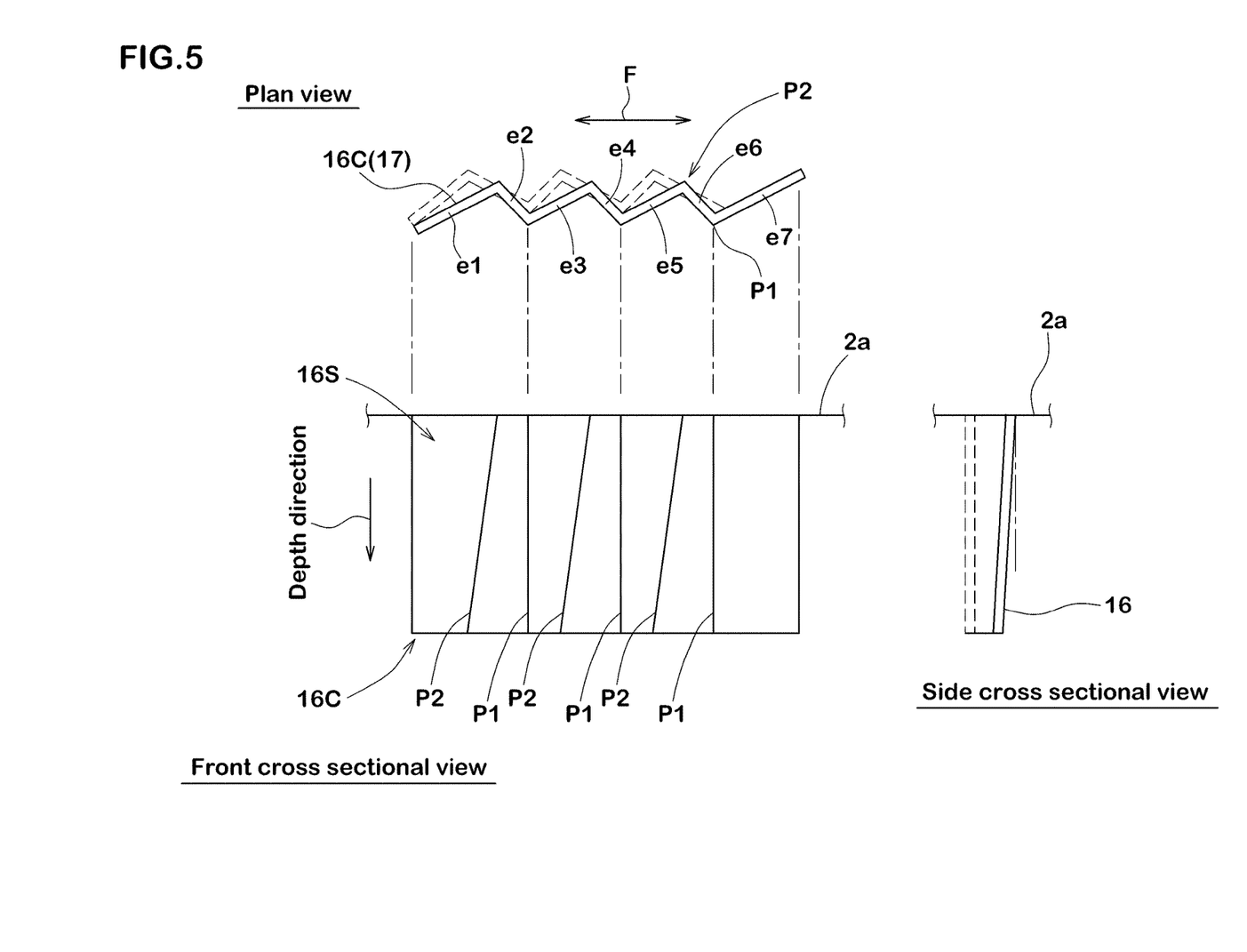
FIG. 5 is a trihedral figure of a three dimensional sipe showing still further embodiment of the present invention.

FIGS. 3 to 5 show a few examples of three dimensional sipes 16 showing an embodiment of the present invention. In each FIGS. 3 to 5, the three dimensional sipe 16 is illustrated using a trihedral figure that includes a plan view, front cross sectional view and side cross sectional view of the sipe.

Referring to FIG. 3, the three dimensional sipe 16A in this embodiment includes a zigzag portion 17 in its opening configuration on a contact surface 2a of the tread portion 2. The sipe surfaces 16S of the three dimensional sipe 16A extends in the depth direction of the sipe while oscillating along the longitudinal direction F of the zigzag portion 17 so as to form a zigzag mountain ridge line P1 and a zigzag valley ridge line P2. Namely, the opening configuration of the sipe 16A is substantially maintained a constant shape toward the bottom of the sipe. Furthermore, the opening configuration of the zigzag portion 17 is maintained in constant within the depth direction of the sipe.

The zigzag mountain ridge lines P1 and zigzag valley ridge lines P2 of the sipe surface 16S extend from the contact surface 2a to the bottom of the sipe while oscillating along the longitudinal direction F of the sipe. In this embodiment, each of ridge lines P1, P2 parallelly extend each other having two peaks Q1, Q2, respectively.

In order to further improve the engagement advantage between sipe surfaces 16S while maintaining rigidity of the axially outer shoulder wide portion 6B, the three dimensional sipe 17 preferably has the total oscillating amplitude Lx in a range of not less than 0.3 mm, more preferably not less than 0.5 mm, but preferably not more than 2.0 mm, more preferably not more than 1.8 mm.

Figure 6:
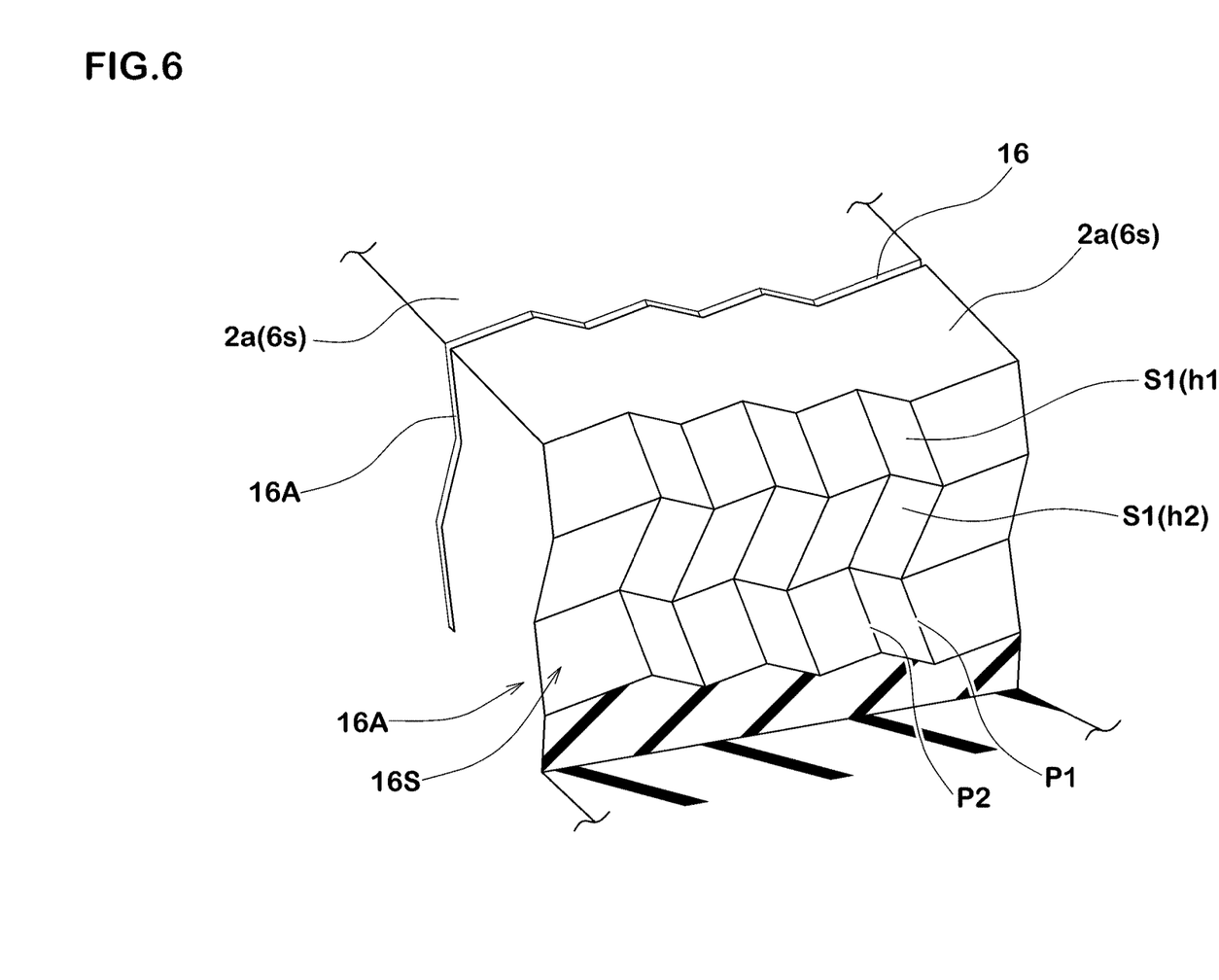
FIG. 6 is a perspective view of a sipe surface of the three dimensional sipe.

FIG. 6 shows a perspective view of the sipe surface 16S of the three dimensional sipe 16A. Referring to FIG. 6, the sipe surface 16S has a three dimensional uneven surface that comprises a plurality of parallelogram planes S1 arranged in longitudinal and depth directions of the sipe to form the "Miura-ori" shape. The sipe surface 16A comprises at least first wall portion h1 that a plurality of parallelogram planes s1 arranged in longitudinal in a zigzag manner, and a second wall portion h2 that a plurality of parallelogram planes S1 arranged in longitudinal in a zigzag manner. Thus, a pair of facing sipe surfaces 16S, 16S engage and support each other when the outboard shoulder portion 6 is subjected to lateral force, whereby large deformation of the block-pieces 6s is effectively prevented. Therefore, the tire 1 may improve the edge scratching effect while preventing loss of tread contact area and friction force or the like.

FIG. 4 shows another embodiment of the three dimensional sipe 16B of the invention. Referring to FIG. 4, the three dimensional sipe 16B in this embodiment includes a zigzag portion 17 in its opening configuration on the contact surface 2a of the tread portion 2. The sipe surfaces 16S of the three dimensional sipe 16B extends in the depth direction of the sipe while oscillating perpendicular to its longitudinal direction F of the zigzag portion 17. The opening configuration of the sipe 16B is substantially maintained a constant shape toward the bottom of the sipe. The three dimensional sipe 16B also has the same advantage as the sipe 16A described above.

FIG. 5 shows another embodiment of the three dimensional sipe 16C of the invention. Referring to FIG. 5, the three dimensional sipe 16C includes the zigzag portion 17 consisting of a plurality of zigzag elements e1 to e7 in its opening configuration on a contact surface of the tread portion, and the sipe surfaces 16S of the three dimensional sipe 16C extends in the depth direction of the sipe while changing a length of at least one of zigzag elements e1 to e7. Namely, the sipe 16C of this embodiment provides the different opening configuration toward the bottom of the sipe. The three dimensional sipe 16C also has the same advantage as the sipe 16A described above.

Figure 7:
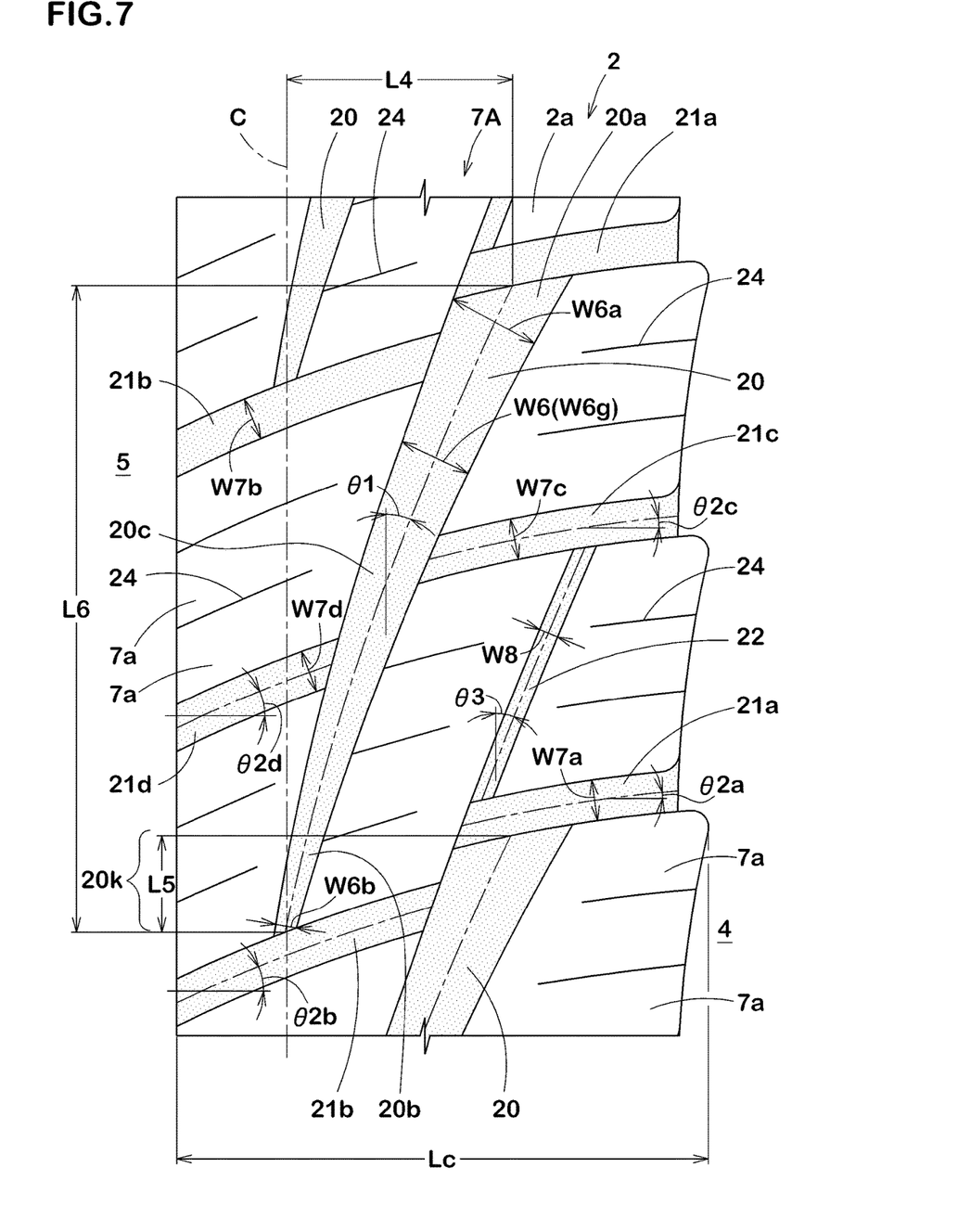
FIG. 7 is a partial enlarged view of an inboard middle portion.

FIG. 7 shows an enlarged view of the inboard middle portion 7A. Referring to FIG. 7, the inboard middle portion 7A is provided with: a plurality of inclined grooves 20, a plurality of first inboard middle lug grooves 21a, and a plurality of second inboard middle lug grooves 21b. Each inclined grooves 20 has an axially outer end 20a and an axially inner end 20b. Each first inboard middle lug grooves 21a extends from the inboard shoulder main groove 4 to the axially outer end 20a of the inclined groove 20. Each second inboard middle lug grooves 21b extends from the middle main groove 5 to the axially inner end 20b of the inclined groove 20.

The inboard middle portion 7A is further provided with a plurality of third inboard middle lug grooves 21c that connecting between the inboard shoulder main groove 4 and a center portion 20c of the inclined groove 20, and a plurality of fourth inboard middle lug grooves 21d connecting between the middle main groove 5 and the center portion 20c of the inclined groove 20. The second inboard middle lug grooves 21b also connects between adjacent inclined grooves 20, 20.

In order to improve traction force, braking force and the like on icy and snowy roads by offering lateral and circumferential edge components of the groove edges, the inclined groove 20 preferably has the angle θ1 in a range of from not less than 10 degrees, more preferably not less than 15 degrees, but preferably not more than 30 degrees, more preferably not more than 25 degrees.

In order to improve traction force on snowy roads by generating large snow shearing force, while maintaining both steering stability on dry roads and wear resistance, by offering suitably rigidity on the inboard shoulder portion 7A, the inclined groove 20 preferably has the groove depth (not shown) in a range of from 90% to 110%, more preferably in a range of from 95% to 105% in respect to the groove depth of the outboard shoulder main groove 3.

In this embodiment, the inclined groove 20 has a groove width W6 that is increasing toward the axially outward of the tire from the tire equator C. The inclined groove 20 helps to disperse the water from under the inboard middle portion 7A to the inboard tread edge (Tei) or inboard shoulder main groove 4, utilizing the first and third inboard middle lug grooves 21a, and 21c. The inclined groove 20 preferably has the groove width w6 in a range of from not less than 3.5 mm, more preferably not less than 4.0 mm, but preferably not more than 9.0 mm, more preferably not more than 8.5 mm, in order to further improve drainage performance and show shearing force. Similarly, the maximum groove width W6a of the inclined groove 20 is preferably in a range of from 350% to 500% in respect to the minimum groove width W6b thereof.

In order to increase an axial groove edge length while maintaining the circumferential rigidity of the inboard shoulder portion 7A, the inclined groove 20 preferably has the axial length L4 in a range of from 30% to 50% in respect to the axial width Lc of the inboard shoulder portion 7A. The axial length L4 of the inclined groove 20 is measure using its groove centerline.

Although the circumferentially adjacent inclined grooves 20, 20 are not directly connected each other, the adjacent inclined grooves 20, 20 partially overlap in the circumferential direction of the tire. Thus, the axially and circumferentially edge effect of the inclined groove 20 is further improved. The overlap portion 20k of adjacent inclined grooves 20, 20 preferably has the circumferential length L5 in a range of not less than 8%, more preferably not less than 10%, but preferably not more than 22%, more preferably not more than 18%, in respect to a circumferential length L6 of the inclined groove 20.

In this embodiment, each of inboard middle lug grooves 21a to 21d is inclined with respect to the axial direction of the tire and is curved in an arc manner, for improving steering stability. In order to further improve friction force generated on icy roads, each of inboard middle lug grooves 21a to 21d preferably has the respective angle θ2a to θ2d in a range of not less than 5 degrees, more preferably not less than 10 degrees, but preferably not more than 40 degrees, more preferably not more than 35 degrees.

In order to further improve the advantage above, each of inboard middle lug grooves 21a to 21d preferably has the respective groove width W7a to W7d in a range of not less than 2.5 mm, more preferably not less than 3.0 mm, but preferably not more than 6.0 mm, more preferably not more than 5.5 mm. Preferably, each of inboard middle lug grooves 21a to 21d has its groove depth (not shown) in a range of not less than 3.0 mm, more preferably not less than 3.5 mm, but preferably not more than 7.0 mm, more preferably not more than 6.5 mm.

Preferably, the inboard middle portion 7A is provided with a middle sub groove 22 connecting between the first middle lug groove 21a and the third middle lug groove 21c. Thus, the tire 1 improves snow shearing force and drainage performance, increasing an amount of groove edges.

Preferably, the middle sub groove 22 has the angle θ3 in a range of from 10 to 30 degrees with respect to the circumferential direction of the tire.

Preferably, the middle sub groove 22 has the groove width W8 in a range of not less than 1.0 mm, more preferably not less than 1.5 mm, but preferably not more than 3.0 mm, more preferably not more than 2.5 mm. Preferably, the middle sub groove 22 has the groove depth (not shown) in a range of not less than 1.0 mm, more preferably not less than 1.5 mm, but preferably not more than 6.0 mm, more preferably not more than 5.5 mm.

The inboard middle portion 7A is provided with plurality of two dimensional sipes 24 each of which has a pair of sipe surfaces extending to a depth direction of the sipe while keeping its direction and opening configuration. Referring to FIG. 7, the two dimensional sipes 24 include not only a straight sipe extending its longitudinal direction of the sipe on the contact surface 2a of the tread portion 2, but also a zigzag sipe extending its longitudinal direction of the sipe on the contact surface 2a of the tread portion 2. Typically, the block-pieces 7a of the inboard middle portion 7A divided by two dimensional sipe 24 tend to deform larger as compared to block-pieces divided by three dimensional sipes. Therefore, the two dimensional sipes are provide on the inboard middle portion 7A that is subjected to less lateral force than the outboard shoulder portion 6, whereby steering stability of the tire is maintained while improving friction force on icy roads.

The two dimensional sipe 24 provided on inboard middle portion 7A is a semi-opened type that has one end connected with the middle main groove 5, inboard middle main groove 4 or inclined groove 20, and the other end terminating within the inboard middle portion 7A. Such a semi-opened two dimensional sipe helps to maintain rigidity of the inboard middle portion 7A and traveling performance on icy roads. For the two dimensional sipes, a closed sipe that has both ends without reaching any other grooves, or a full-opened sipe that has both ends reaching grooves may be employed.

Referring to FIG. 1, the outboard middle portion 7B is provided with a plurality of middle lug grooves 25 that extend from inner groove edge 10 toward the tire equator C terminating within the outboard middle portion 7B. The middle lug grooves 25 helps to improve traveling performance on snowy roads.

In order to maintain proper balance between traveling performance on snowy roads and rigidity of the outboard middle portion 7b, the middle lug groove 25 preferably has the axial length L7 in a range of from 30% to 50% in respect to the maximum axial width Ld of the outboard middle portion 7B.

In the same point of view above, the middle lug groove 25 preferably has the groove width W9 in a range of not less than 1.5 mm, more preferably not less than 2.0 mm, but preferably not more than 4.5 mm, more preferably not more than 4.0 mm. The middle lug groove 25 preferably has the groove depth (not shown) in a range of not less than 4.0 mm, more preferably not less than 4.5 mm, but preferably not more than 7.0 mm, more preferably not more than 6.5 mm.

The outboard middle portion 7B is further provided with a plurality of two dimensional sipes 26. In this embodiment, the two dimensional sipes 26 provided on the outboard middle portion 7B include a first sipe 26a that connects between the middle main groove 5 and the middle lug groove 25, and a second sipe 26b that connects between the middle main groove 5 and the outboard shoulder main groove 3. Namely, the first and second sipes 26a, 26b are full-opened sipe that preferably offer edge scratching effect. Especially, the first sipe connected with the middle lug groove 25 further improves edge scratching effect utilizing large deformation of the middle lug groove 25.

The inboard shoulder portion 8 is further provided with a plurality of inboard shoulder lateral grooves 27 to form a block row 8R that comprises a plurality of inboard shoulder blocks 8A arranged in the circumferential direction of the tire.

In this embodiment, each inboard shoulder lateral groove includes a first portion 27a extending from the inboard shoulder main groove 4 with a constant groove width, a second portion 27b extending from the first portion 27a toward the inboard tread edge (Tei) while expanding its groove width, and a third portion 27c extending from the second portion 27b with a constant groove width that is larger than that of the first portion 27a. Due to the inboard shoulder lateral grooves 27, snow shearing force, drainage performance and rigidity of the inboard shoulder portion 8 may be improved.

In order to effectively improve the advantage above, the inboard shoulder lateral grooves 27 preferably have groove widths W10 in a range of from 2.0 to 6.5 mm, and groove depths (not shown) in a range of from 3.0 to 7.0 mm.

Each inboard shoulder block 8A is provided with at least one two dimensional semi-opened sipe 29 that extends from the inboard tread edge (Tei) toward the tire equator C and has the axially inner end terminating within the inboard shoulder block 8A. In this embodiment, two sipes 29 is arranged in each inboard shoulder block 8A. The two dimensional semi-opened sipe 29 may maintain rigidity of the inboard shoulder portion 8 that is subjected to large lateral force when cornering.

In order to further improve steering stability and wear resistance on icy and dry roads, both of two dimensional sipes 24, 29 provided on the inboard middle and shoulder portions 7A, 8A preferably have circumferential pitches L8 in a range of from 5.0 to 10.0 mm, respectively.

The present invention is more specifically described and explained by means of the following Examples and References. It is to be understood that the present invention is not limited to these Examples and embodiments described above.

Comparison Test

Pneumatic tires having a tire size of 215/60R16 with basic tread patterns of FIG. 1 except for details shown in Table 1 were made and tested with respect to steering stability on a dry road, traveling performance on icy and snowy roads, drainage performance, and wear resistance. Major common specifics of tires and test method are as follows.

Details of Test Tires:

Rim size: 16×6.5 JJ

Internal pressure: 200 kPa

Tread width TW: 160 mm

Groove Depths

Outboard shoulder main grooves: 7.9 mm

Inboard shoulder main grooves: 7.9 mm

Middle main grooves: 8.1 mm

Outboard shoulder narrow grooves: 1.0 mm

Shoulder lug grooves: 4.0 to 6.0 mm

First to fourth inboard middle lug grooves: 3.5 to 5.5 mm     Inboard middle sub grooves: 5.0 mm     Middle lug grooves: 5.5 to 6.5 mm     Inboard shoulder lateral grooves: 4.0 to 6.0 mm Configuration of three dimensional sipe: FIG. 3

Steering Stability on Dry Road Test:

A four wheel drive car with a displacement of 2,000 cc provided on all the wheels with test tires was driven by a professional test driver on a test course having a dry asphalt road, and evaluated steering stability such as the steering response, stiffness and grip according to his feeling. The results are shown with a score of 100 representing a value in Ref.1. The larger the value, the better the performance is.

Traveling Performance on Icy Road:

The test car above was driven on an icy road under a temperature of −10 degrees C., and measured the braking distance from a traveling speed of 20 km/hr. Further, the reciprocal number of the braking distance of each tires were measured. The results are shown with an index of 100 representing a value in Ref.1. The larger the value, the better the performance is.

Traveling Performance on Snowy Road:

The test car above was driven on a compressed snowy road, and evaluated steering stability such as the steering response, stiffness and grip according to his feeling. The results are shown with a score of 100 representing a value in Ref.1. The larger the value, the better the performance is.

Drainage Performance:

The test car was entered into a course with a water puddle 10 mm deep and 20 m long, on an asphalt road surface with a radius of 100 m, with stepwise speed increase. Then, lateral acceleration (lateral G) of the vehicle was measured, and average lateral G of the front wheels at speeds of 50 to 80 km/h was calculated. Calculation results are shown with an index of 100 representing a value in Ref.1. The larger the value, the better the performance is.

Wear Resistance:

The test car was run for 8,000 km on roads that include 50% speedway, 35% ordinary road and 15% mountain road, and then groove depths of shoulder lug grooves at the position 10 mm away from the tread edge were measured at evenly eight places in the circumferential direction of the tire, respectively. The average groove depth in each tire was evaluated. The results are indicated by an index based on Ref.1 being 100. The larger the value, the better the performance is.

Test results are shown in Table 1

TABLE 1

|  | Ex. 1 | Ref. 1 | Ref. 2 | Ref. 3 | Ref. 4 | Ex. 2 | Ex. 3 | Ex. 4 | Ex. 5 | Ex. 6 | Ex. 7 |
| --- | --- | --- | --- | --- | --- | --- | --- | --- | --- | --- | --- |
| Sipes on outboard shoulder portion * | 3 | 2 | 3 | 2 | 2 | 3 | 3 | 3 | 3 | 3 | 3 |
| Sipes on middle portion * | 2 | 2 | 3 | 3 | 2 | 3 | 2 | 2 | 2 | 2 | 2 |
| Sipes on inboard shoulder portion * | 2 | 2 | 3 | 2 | 3 | 2 | 2 | 2 | 2 | 2 | 2 |
| Inclined groove angle θ1 [deg.] | 20 | 20 | 20 | 20 | 20 | 20 | 8 | 10 | 30 | 32 | 20 |
| Inclined groove depth/Outboard shoulder main groove depth [%] | 100 | 100 | 100 | 100 | 100 | 100 | 100 | 100 | 100 | 100 | 85 |
| Inclined groove average width W6g [mm] | 6.5 | 6.5 | 6.5 | 6.5 | 6.5 | 6.5 | 6.5 | 6.5 | 6.5 | 6.5 | 6.5 |
| Overlapped portion length L5/L6 [%] | 15 | 15 | 15 | 15 | 15 | 15 | 15 | 15 | 15 | 15 | 15 |
| Steering stability on dry road [Score] | 120 | 100 | 125 | 105 | 105 | 122 | 120 | 120 | 120 | 120 | 123 |
| Traveling performance on icy road [Score] | 95 | 100 | 75 | 90 | 90 | 90 | 90 | 93 | 93 | 90 | 92 |
| Traveling performance on snowy road [Score] | 100 | 100 | 100 | 100 | 100 | 100 | 100 | 100 | 100 | 100 | 95 |
| Drainage performance [Index] | 100 | 100 | 100 | 100 | 100 | 100 | 100 | 100 | 100 | 100 | 97 |
| Wear resistance [Index] | 115 | 100 | 118 | 105 | 105 | 117 | 115 | 115 | 115 | 115 | 118 |

|  | Ex. 8 | Ex. 9 | Ex. 10 | Ex. 11 | Ex. 12 | Ex. 13 | Ex. 14 | Ex. 15 | Ex. 16 | Ex. 17 | Ex. 18 |
| --- | --- | --- | --- | --- | --- | --- | --- | --- | --- | --- | --- |
| Sipes on outboard shoulder portion * | 3 | 3 | 3 | 3 | 3 | 3 | 3 | 3 | 3 | 3 | 3 |
| Sipes on middle portion * | 2 | 2 | 2 | 2 | 2 | 2 | 2 | 2 | 2 | 2 | 2 |
| Sipes on inboard shoulder portion * | 2 | 2 | 2 | 2 | 2 | 2 | 2 | 2 | 2 | 2 | 2 |
| Inclined groove angle θ1 [deg.] | 20 | 20 | 20 | 20 | 20 | 20 | 20 | 20 | 20 | 20 | 20 |
| Inclined groove depth/Outboard shoulder main groove depth [%] | 90 | 110 | 115 | 100 | 100 | 100 | 100 | 100 | 100 | 100 | 100 |
| Inclined groove average width W6g [mm] | 6.5 | 6.5 | 6.5 | 2.5 | 3.5 | 9 | 10 | 6.5 | 6.5 | 6.5 | 6.5 |
| Overlapped portion length L5/L6 [%] | 15 | 15 | 15 | 15 | 15 | 15 | 15 | 6 | 8 | 22 | 25 |
| Steering stability on dry road [Score] | 122 | 114 | 110 | 123 | 122 | 116 | 114 | 123 | 122 | 117 | 113 |
| Traveling performance on icy road [Score] | 94 | 97 | 99 | 90 | 92 | 98 | 99 | 93 | 94 | 96 | 98 |
| Traveling performance on snowy road [Score] | 98 | 104 | 107 | 94 | 96 | 103 | 104 | 94 | 99 | 103 | 106 |
| Drainage performance [Index] | 98 | 103 | 103 | 98 | 99 | 102 | 103 | 96 | 97 | 102 | 104 |
| Wear resistance [Index] | 116 | 110 | 105 | 121 | 119 | 110 | 106 | 118 | 117 | 111 | 103 |

(*) 2: two dimensional sipes 3: three dimensional sipes

From the test results, it was confirmed that Example tires in accordance with the present invention can be effectively improved traveling performance as compared with the reference tires. Through the other experiments, it was also confirmed that three dimensional sipes illustrated in FIGS. 4 to 5 showed the same superior performances as mentioned above.

The invention claimed is:

1. A pneumatic tire comprising:
a tread portion having an asymmetric pattern having a designated installing direction to a vehicle for defining an inboard tread edge and an outboard tread edge; and
the asymmetric pattern including:
an outboard shoulder main groove that continuously extends in a circumferential direction of the tire nearest to the outboard tread edge;
an inboard shoulder main groove that continuously extends in a circumferential direction of the tire nearest to the inboard tread edge,
an outboard shoulder portion between the outboard shoulder main groove and the outboard tread edge;
a middle portion between the outboard shoulder main groove and the inboard shoulder main groove; and
an inboard shoulder portion between the inboard shoulder main groove and the inboard tread edge, wherein
the outboard shoulder portion is provided with a three dimensional sipe that has a pair of sipe surfaces extending in a depth direction of the sipe while changing its direction or opening configuration, and
the inboard shoulder portion or the middle portion is provided with a two dimensional sipe that has a pair of sipe surfaces extending in a depth direction of the sipe while maintaining its direction and opening configuration,
the outboard shoulder main groove comprises an axially inner groove edge that extends in a zigzag manner,
the middle portion comprises an outboard middle portion disposed adjacently to the outboard shoulder land portion, and
the middle portion is provided with a middle lug groove that extends from the axially inner groove edge of the outboard shoulder main groove to an axially inner end terminating within the outboard middle portion in a one-end opening manner;
wherein the outboard shoulder portion is provided with a circumferentially extending shoulder narrow groove such that the outboard shoulder portion is divided into an axially inner shoulder narrow portion and an axially outer shoulder wide portion; and
wherein the axially inner shoulder narrow portion is a plain rib without being provided any grooves or sipes.

2. The tire according to claim 1, wherein
the middle portion is provided with an inclined groove having an angle of from 10 to 30 degrees with respect to a circumferential direction of the tire.

3. The tire according to claim 2, wherein
the inclined groove has a groove depth in a range of from 90% to 110% in respect to a groove depth of the outboard shoulder main groove.

4. The tire according to claim 1, wherein
the three dimensional sipe includes a zigzag portion in its opening configuration on a contact surface of the tread portion, and
the sipe surfaces of the three dimensional sipe extends in the depth direction of the sipe while oscillating along a longitudinal direction of the zigzag portion.

5. The tire according to claim 1, wherein
the three dimensional sipe includes a zigzag portion in its opening configuration on a contact surface of the tread portion, and the sipe surfaces of the three dimensional sipe extends in the depth direction of the sipe while oscillating perpendicular to a longitudinal direction of the zigzag portion.

6. The tire according to claim 1, wherein
the three dimensional sipe includes a zigzag portion in its opening configuration on a contact surface of the tread portion, wherein the opening configuration of the sipe changes toward a bottom of the sipe.

7. The tire according to claim 1, wherein the outboard shoulder main groove comprises an axially outer groove edge that extends in a straight manner.

8. The tire according to claim 1, wherein the three dimensional sipe provided on the outboard shoulder portion extends from the outboard tread edge and terminates at the shoulder narrow groove.

9. The tire according to claim 1, wherein the axially inner groove edge of the outboard shoulder main groove comprises an inclined long side and an inclined short side having an inclination opposite to the inclined long side which are arranged alternately in the circumferential direction of the tire, and the middle lug groove extends from the inclined long side.

10. The tire according to claim 1, wherein the outboard middle portion is further provided with a plurality of two dimensional sipes comprising a first sipe connected to the middle lug groove.

* * * * *